United States Patent [19]

Nelle

[11] Patent Number: 4,776,098

[45] Date of Patent: Oct. 11, 1988

[54] LENGTH MEASURING APPARATUS WITH TEMPERATURE COMPENSATION

[75] Inventor: Gunther Nelle, Bergen, Fed. Rep. of Germany

[73] Assignee: Johannes Heidenhain GmbH, Traunreut, Fed. Rep. of Germany

[21] Appl. No.: 73,515

[22] Filed: Jul. 15, 1987

[30] Foreign Application Priority Data

Jul. 30, 1986 [DE] Fed. Rep. of Germany ....... 3625795

[51] Int. Cl.$^4$ .............................................. G01B 11/04
[52] U.S. Cl. ................................ 33/125 T; 33/125 C; 33/125 R
[58] Field of Search ............. 33/125 R, 125 T, 125 A, 33/125 C

[56] References Cited

U.S. PATENT DOCUMENTS

| 4,160,328 | 7/1979 | Ernst | 33/125 R |
| 4,170,829 | 10/1979 | Nelle | 33/125 C X |
| 4,320,578 | 3/1982 | Ernst | 33/125 T |
| 4,479,304 | 10/1984 | Nelle | 33/125 R |
| 4,530,157 | 7/1985 | Nelle | 33/125 T X |
| 4,554,741 | 11/1985 | Affa | 33/125 T X |
| 4,584,773 | 4/1986 | Rieder et al. | 33/125 T X |

FOREIGN PATENT DOCUMENTS 2853771 6/1980 Fed. Rep. of Germany.
3219083 11/1983 Fed. Rep. of Germany.
3243966 5/1984 Fed. Rep. of Germany.

*Primary Examiner*—William D. Martin, Jr.
*Attorney, Agent, or Firm*—Willian Brinks Olds Hofer Gilson & Lione Ltd.

[57] ABSTRACT

In a length measuring apparatus for measuring the relative position of two objects movable relative to each other a scanning unit fastened to the first object scans the graduation of a scale fastened to the second object. The scale is connected to the second object at both ends by means of two fastening elements. Each fastening element has a length compensation element allowing translatory movement of bearings at the ends of the scale in the measuring direction. The fixing of a reference point on the scale with respect to the second object is accomplished by means of a fixing element which renders one of the length compensation elements ineffective in its functioning.

10 Claims, 2 Drawing Sheets

LENGTH MEASURING APPARATUS WITH TEMPERATURE COMPENSATION

BACKGROUND OF THE INVENTION

1. Field of the Invention

This invention relates to a length measuring apparatus for measuring the relative position of two objects movable relative to each other. The apparatus includes a scanning unit attached to the first object capable of scanning the graduation of a scale attached to the second object. This apparatus is especially useful for measuring the position of a tool relative to a workpiece. The apparatus is also useful in coordinate measuring machines for determining position and/or dimensions of test objects.

2. Prior Art

German unexamined patent specification OS No. 2,853,771 discloses a length measuring arrangement for measuring the relative position of a first and second object movable relative to one another, in which a scanning unit fastened to the first object scans the graduation of a scale on a carrier. The carrier is joined at both ends to the second object by means of fastening elements. One end of the carrier is connected directly to the second object with a fastening element. At the other end, a length compensation element deflectable only in the direction of measurement is positioned between the carrier and the fastening element. This length compensation element is formed as a plate which is subdivided by a U-shaped slit into an inner part and an outer part. The inner part projects in the measuring direction while the outer part is rigidly positioned, being joined via the fastening element to the carrier. The length compensation element allows translatory movement of the other end of the carrier in the measuring directoon, eliminating longitudinal forces resulting from thermally-induced length changes of the carrier. As a result, different thermal expansion coefficients of the carrier and the second object will not affect measuring accuracy. A fixed measuring reference point on one end of the scale is effected with respect to the second object by the direct fastening of the one end of the carrier of the scale to the second object using a fastening element.

German patent No. 3,219,083 discloses a similarly constructed length measuring system in which the length compensation element at the second end of the carrier is integrated into the fastening element. A spring element associated with the fastening element comprises meander-form slits running in planes substantially perpendicular to the measuring direction.

German unexamined patent specification OS No. 3,242,966 discloses a length measuring system for measuring the relative position of a first and second object movable relative to one another in which a scanning unit fastened to the first object scans the graduation of a scale on a carrier. The carrier of the scale is connected to the second object via fastening elements located at both ends and about the middle of the carrier. The fastening elements at both ends are associated with length compensation elements to allow translatory movement of both ends of the carrier in the direction of measurement. The fixed measuring reference point with respect to the second object is established by fastening the center of the carrier of the scale directly to the second object using a fastening element. By allowing translatory movement of the ends of the carrier in the measuring direction, the length compensation elements eliminate longitudinal forces evoked by thermally-induced length changes of the carrier. As a result, different thermal expansion coefficients of the carrier and the second object will not affect measuring accuracy. The two length compensation elements each consist of a spring element comprising meander-form slits running in planes substantially perpendicular to the measuring direction. The length compensation elements are integrated into the fastening elements.

In the above-mentioned length measuring arrangements the fixed measuring reference point of the scale with respect to the object to be measured is established during manufacturing and cannot be varied by the user. The preferred position of the measuring reference point on the scale, however, varies both with the type of processing machine and with the place of attachment of the measuring apparatus on the machine parts of each processing machine. Different machine parts whose relative position is to be measured generally exhibit different temperature behavior whether the different parts are located in the same or different processing machines. The user, in ordering such a length measuring arrangement, must select a fixed measuring reference point on the scale suitable for the specific place of attachment to the specific processing machine. Use of the same length measuring arrangement in different places of attachment is not always possible because of the generally different temperature behavior.

OBJECT AND SUMMARY OF THE INVENTION

The invention solves the above problem by providing a length measuring apparatus in which the position of the measuring reference point on the scale can be varied by the user.

In one embodiment of the invention an apparatus for measuring the relative position of two objects movable relative to each other includes a scanning unit fastened to the first object and a scale with a graduation fastened to the second object. The scanning unit is designed for scanning the graduation of the scale. Fastening elements for joining the scale to the second object are positioned at both ends of the scale. A length compensation element is positioned between the scale and at least one of the fastening elements. Alternatively, length compensation elements can be positioned at both ends of the scale, between the scale and both fastening elements. A fixing element is utilized for fixing the position of at least one of the length compensation elements.

One important advantage of this invention is that the position of the measuring reference point on the scale can be easily set by the user himself, even after the length measuring arrangement has been mounted on the processing machine, to reflect the conditions present. The length measuring arrangements described below can be used universally on a wide range of processing machines and attachment positions. This eliminates the need for manufacturing and stocking length measuring arrangements having scales with different fixed measuring reference points. To accommodate different temperature behavior between different machine components, the position of the measuring reference point can be varied to obtain optimal fastening of the scale to the machine part to be measured. With this invention, different thermal expansion coefficients between the scale or the carrier of the scale and the object (machine part) to be measured will no longer result in measurement errors caused by thermal length changes of the scale or its carrier.

DETAILED DESCRIPTION OF THE PRESENTLY PREFERRED EMBODIMENTS

Figure 1:
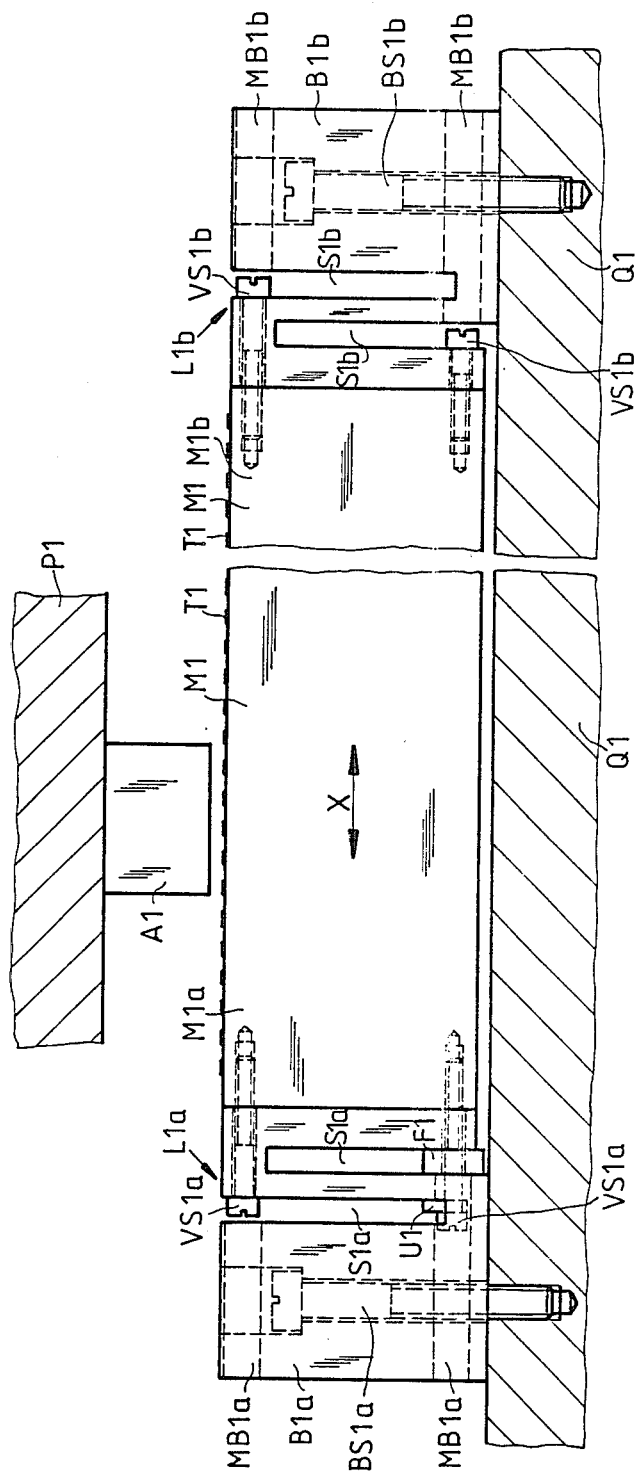
FIG. 1 shows a side view of a first embodiment of the incremental length measuring apparatus of the invention.

FIG. 1 shows a side view of an incremental length measuring apparatus for measuring the relative position of two objects P1, Q1 movable relative to one another in the measuring direction X. The first object P1 is formed by a slide piece. The second object Q1, for example of gray cast iron, is formed by the machine bed of a processing machine (not shown). A scanning unit A1 is fastened to the first object P1 to scan an incremental graduation T1 of a scale M1 to determine the relative position of the two objects P1, Q1 in measuring direction X. The scale M1, for example of steel, is connected at the first end M1a by means of a first fastening element B1a and at the second end M1b by means of a second fastening element B1b to the second object Q1. The first fastening element is fastened by means of first fastening screws BS1a and the second fastening element B1b by means of second fastening screws BS1b rigidly to the second object Q1. The scale M1 is connected to the first end M1a by means of first connecting screws VS1a with the first fastening element B1a and to the second end M1b by means of second connecting screws BS1b with the second fastening element B1b.

In the first fastening element B1a there is integrated between the first fastening screws BS1a and the first end M1a of the scale M1 a first length compensation element L1a which includes first meander-form slits S1a running in planes substantially perpendicular to the measuring direction X. Similarly, in the second fastening element B1 between the two fastening screws BS1b and the second end M1b of the scale M there is integrated a second length compensation element which includes meander-form slits S1b running in planes substantially perpendicular to the measuring direction X.

The two length compensation elements L1a, L1b, instead of being integrated in a preferred manner in the two fastening elements B1a, B1b, may also be positioned (in a manner not shown) separately between the two fastening elements B1a, B1b and the two ends M1a, M1b of the scale M1.

The two length compensation elements L1a, L1b in the two fastening elements B1a, B1b allow translatory movement of the two ends M1a, M1b of the scale M1 in measuring direction X. Where different construction materials are used for the scale M1 and the second object Q1, different thermal expansion coefficients result in thermally-induced length changes of the scale M1 with respect to the second object Q1. By operation of the length compensation elements, the scale M1 is isolated from longitudinal forces which can lead to inaccuracies in measurement.

For accurate measurement of the relative position of the two objects P1, Q1, in accordance with their respective temperature behavior, there must be established a measuring reference point (zero point) of the graduation of the scale M1 with respect to the second object Q1. In FIG. 1 let this fixed measuring reference point of the graduation T1 with respect to the second object Q1 lie at the first end M1a of the scale M1. For this purpose the first length compensation element L1a is rendered inactive by a fixing element F1. The two lower first connecting screws VS1a, whose screw heads during the active state of the first length compensation element L1a are located in the end of the first meander-form slit S1a facing the first end M11a of the scale M1, are released and drawn out of their assembly bores MB1a.

The fixing element F1 includes a plate whose thickness corresponds to the width of the first meanderform slit S1a facing the first end M1a of the scale M1 in measuring direction X. After the fixing element F1 has been slid into this first meander-form slit S1a, the two lower first connecting screws VS1a become associated with a supporting bearing disk U1, inserted in their assembly bores MB1a and tightened. The two supporting disks U1 cause the screw heads of the two lower first connecting screws VS1a to be in the first meander-form slit S1a positioned further from the first end M1a of the scale M1. Tightening of the two lower first connecting screws VS1a causes the fixing element F1 to be clamped in the first meander-form slit facing the first end M1a of the scale M1. The fixing element F1 renders the first length compensation element L1a inactive, preventing translatory movement of the first end M1a of the scale M1 with respect to the second object Q1. The graduation T1 at the first end M1a of the scale M1 thus provides a fixed measuring reference point with respect to the second object Q1.

If the length measuring apparatus is fastened in another position on the same second object Q1, or to another second object Q1 of the same processing machine, or to a different processing machine, and if this reattachment results in different thermal expansion characteristics, the measuring reference point of the graduation T1 can be shifted to the second end M1b of the scale M1. For this purpose the second length compensation element L1b is rendered inactive. The fixing element F1 is removed from the first length compensation element L1a and, in the above-described manner, installed in the second length compensation element L1b.

The two length compensation elements L1a, L1b are similar in their functioning, but are constructed in mirror-image to one another. The meander-form slits S1a, S1b of the two length compensation elements L1a, L1b make possible, in addition to the translatory degrees of freedom for the two ends M1a, M1b of the scale M1 in measuring direction X, a certain angular movement of the two fastening elements B1a, B1b with respect to the scale M1. This angular movement occurs in a plane parallel to the measuring direction X and perpendicular to the attachment surface of the two fastening elements B1a, B1b on the second object Q1 and permits a tension-free attaching of the scale M1 to the second object Q1. This angular mobility of the two fastening elements B1a, B1b is present whether they are active or inactive.

Figure 2:
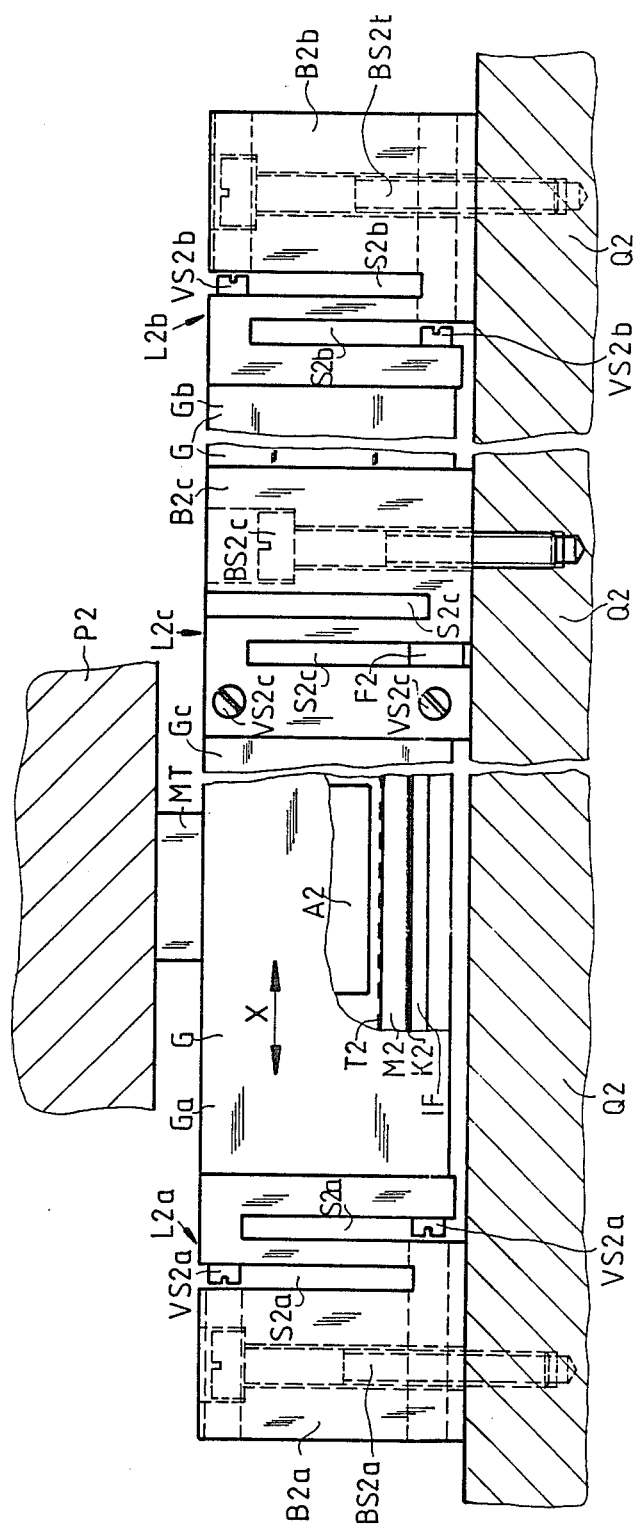
FIG. 2 shows a side view of a second embodiment in which the incremental length measuring apparatus is encapsulated.

In FIG. 2 there is shown in side view an encapsulated incremental length measuring arrangement for measuring the relative position of two objects P2, Q2 movable relative to one another in the measuring direction X. The two objects represent a slide piece and a machine bed, for example of gray cast iron, of a processing machine (not shown). A carrier G for a scale M2, for example of glass, serves as a housing for the scale M2. The carrier G is in the form of a bending-rigid elongated hollow profile, for example of aluminum. The scale M2 with an incremental graduation T2 is fastened by means of an elastic adhesive layer K2 to an inner surface IF of the housing G. A scanning unit A2 is fastened to the first object P2 over a sword-shaped follower MT to scan the scale M2 in the interior of the housing G. The scanning unit A2 scans the graduation T2 of the scale M2 in measuring direction X to measure the relative position of the two objects P2, Q2.

The housing G for the scale M2 is joined at the first end Ga by means of a first fastening element B2a and at the second end Gb by means of a second fastening element B2b with the second object Q2. The first fastening element B2a is fastened by means of first fastening screws BS2a and the second fastening element B2b is joined by means of second fastening screws BS2b rigidly to the second object Q2. The housing G is joined at the first end Ga by means of first connecting screws VS2a with the first fastening element B2a and at the second end Gb by means of second connecting screws VS2b with the second fastening element B2b.

In the first fastening element B2a between the first fastening screws BS2a and the first end Ga of the housing G there is integrated a first length compensation element L2a comprising first meander-form slits S2a running in planes substantially perpendicular to the measuring direction X. Similarly, in the second fastening element B2b between the second fastening screws BS2b and the second end Gb of the housing G there is integrated a second length compensation element L2b comprising second meander-form slits S2b running in planes substantially perpendicular to the measuring direction X.

The two length compensation elements L2a, L2b may, instead of being integrated in the two fastening elements B2a, B2b in preferred manner, be arranged in a manner not shown as separate elements between the two fastening elements B2a, B2b and the two ends Ga, Gb of the housing G.

The two length-compensation elements L2a, L2b in the two fastening elements B2a, B2b provide for translatory movement of the two ends Ga, Gb of the housing G in measuring direction X. Where different construction materials are used for the housing G and the second object Q2, different thermal expansion coefficients result in thermally-induced length changes of the housing G with respect to the second object Q2. By operation of the length compensation elements, the housing G is isolated from longitudinal forces which can lead to inaccuracies in measurement.

In about the middle Gc of the housing G there is a third fastening element B2c fastened rigidly to the second object Q2 by means of third fastening screws BS2c. The middl Gc of the housing G is joined by means of third connecting screws VS2c with the third fastening element B2c. In the third fastening element, between the third fastening screws BS2c and the middle Gc of the housing G, there is integrated a third length compensation element L2c comprising third meander-form slits S2c running in planes substantially perpendicular to the measuring direction X. Instead of being integrated in the third fastening element B2c as shown in FIG. 2, the third length compensation element L2c may be arranged, in a manner not shown, as a separate element between the third fastening element B2c and the middle Gc of the housing G. The third length compensation element L2c likewise provides for translatory movement of the middle Gc of the housing G in measuring direction X. In FIG. 2 let the fixed measuring reference point of the graduation T2 of the scale M2 with respect to the second object Q2 lie in the middle of the graduation T2 and therewith in the middle Gc of the housing G. For this purpose it is necessary to make the third length compensation element L2c inactive by means of a fixing element F2. The fixing element F2 includes a plate whose thickness corresponds to the width of the third meander-form slit S2c facing the middle Gc of the housing G in measuring direction X. The fixing element F2 is thrust into this third meander-form slit and clamped by means of clamping elements (not represented). The fixing element F2 renders the third length compensation element L2c inactive, preventing translatory movement of the middle Gc of the housing G. The center of the graduation T2 is thereby established as a fixed measuring reference point with respect to the second object G2.

If other attachment positions of the length measuring arrangement make establishment of another measuring reference point for the graduation T2 of scale M2 necessary, the fixing element F2 can be removed from the third length compensation element L2c and installed in the first length compensation element L2a or in the second length compensation element L2b. Installation of the fixing element F2 into the first length compensation element L2a or into the second length compensation element L2b occurs in the same manner as has been described for the two length compensation elements L1a, L1b of FIG. 1. Using the fixing element F2, any one of the three length compensation elements L2a, L2b, L2c can be rendered inactive to obtain the required measuring reference point on the graduation T2 of scale M2. This allows the user to accommodate the particular temperature properties of the second object Q2 as they may vary with the attachment position of the length measuring arrangement on the second object Q2.

The first length-compensation element L2a and the second length-compensation element L2b on the two ends Ga, Gb of the housing G are similarly constructed, but in mirror image to one another. In addition to the translatory degrees of freedom for the two ends Ga, Gb and for the center Gc of the housing G in measuring direction X, the meander-form slits S2a, S2b, S2c of the three length compensation elements L2a, L2b, L2c make possible angular movement of the three fastening elements B2a, B2b, B2c with respect to the housing G in a plane parallel to the measuring direction X and perpendicular to the attachment surface of the three fastening elements B2a, B2b, B2c to the second object Q2. This angular movement permits a tension-free attachment of the housing G to the second object Q2. This angular mobility of the three fastening elements B2a, B2b, B2c exists whether they are active or inactive.

The length measuring apparatus of FIG. 1 can also be provided with a third fastening element (not shown) and with a length-compensation element in the center of the scale M1. The third fastening element with a length compensation element can alternatively be positioned anywhere between the ends M1a, M1b of the scale M1 or between the ends Ga, Gb of the housing G. Additional fastening elements with length compensation elements can also be positioned between the ends M1a, M1b of the scale M1 and between the ends Ga, Gb of the housing G. This is especially recommended when great measuring lengths are required of the length measuring system.

If need be, the user may (in a manner not shown) render more than one length compensation element inactive using additional fixing elements.

The invention is especially useful in incremental length measuring systems that are based on the photoelectric, magnetic, capacitive or inductive measuring principle.

I claim:

1. In an apparatus for measuring the relative position of a first and second object movable relative to each other, of the type comprising a scanning unit fastened to said first object, a scale, means, comprising a plurality of fastening elements, for connecting said scale to said second object, said scale comprising a graduation, said scanning unit comprising means for scanning the graduation of said scale, the improvement comprising:

a plurality of length compensation elements interposed between the scale and the second object to accommodate translatory movement of the scale with respect to the second object along a direction of measurement, said length compensation elements comprising first and second length compensation elements associated with respective first and second fastening elements included in the plurality of fastening elements; and a fixing element coupled to said first length compensation element to prevent movement along the measuring direction between the scale and the second object at the first length compensation element;

said second length compensation element effective to accommodate movement along the measuring direction between the scale and the second object.

2. The apparatus of claim 1 wherein said first and second fastening elements are each positioned at a respective end of said scale.

3. The apparatus of claim 1 wherein said first and second length compensation elements are each positioned at a respective end of said scale.

4. The apparatus of claim 1 wherein each of said length compensation elements defines respective meander-form slits running in planes substantially perpendicular to said direction of measurement.

5. The apparatus of claim 1 wherein each of said length compensation elements is integrated into a respective one of said fastening elements.

6. The apparatus of claim 4 wherein said fixing element comprises a plate having a thickness corresponding to the width of said meander-form slits of said first length compensation element in said direction of measurement.

7. The apparatus of claim 6 further comprising means for clamping said fixing element in said meander-form slits of said first length compensation element.

8. The apparatus of claim 1 wherein said means for connecting said scale to said second object comprises a housing serving as carrier for said scale and fastened thereto by means of an elastic adhesive layer, said housing connected to said second object by means of said fastening elements, said fastening elements positioned at both ends and in the middle of said housing; and wherein said plurality of length compensation elements comprises at least three length compensation elements positioned at both ends and in the middle of said housing.

9. An apparatus for measuring the relative position of a first and second object movable relative to each other comprising a scanning unit fastened to said first object, a scale, fastening elements at both ends of said scale for connecting said scale to said second object, and a plurality of length compensation elements, each integrated into a respective one of said fastening elements adapted to accommodate translatory movement of said scale along a direction of measurement, said scale comprising a graduation, said scanning unit comprising means for scanning the graduation of said scale, each of said length compensation elements defining meander-form slits running in planes substantially perpendicular to said direction of measurements, a first one of said length compensation elements comprising a fixing element for rendering said first length compensation element inactive, said fixing element comprising a plate having a thickness which corresponds to the width of said meander-form slits of said first length compensation element in said direction of measurement.

10. An apparatus for measuring the relative position of a first and second object movable relative to each other comprising a scanning unit fastened to said first object; a scale; a housing serving as a carrier for said scale and fastened thereto by means of an elastic adhesive layer, said housing joined to said second object by means of at least three fastening elements positioned at both ends and in the middle of said housing; and at least three length compensation elements, each integrated into a respective one of said fastening elements adapted to accommodate translatory movement of said housing along a direction of measurement; said scale comprising a graduation, said scanning unit comprising means for scannaing the graduation of said scale, each of said length compensation elements defining meander-form slits running in planes substantially perpendicular to said direction of measurement, a first one of said length compensation elements comprising a fixing element for rendering said first length compensation element inactive, said fixing element comprising a plate having a thickness which corresponds to the width of said meander-form slits of said first length compensation element in said direction of measurement.

* * * * *